Figure 1:
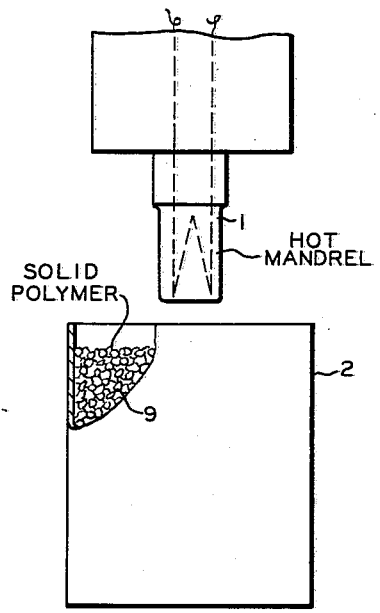

INVENTORS
B.L. WALKER
D.L. KRAFT
BY *Hudson + Young*
ATTORNEYS

3,002,231
MOLDING PROCESS

Billy L. Walker, Clovis, N. Mex., and Donald L. Kraft, Bartlesville, Okla., assignors to Phillips Petroleum Company, a corporation of Delaware
Filed June 6, 1958, Ser. No. 740,190
13 Claims. (Cl. 18—59)

This invention relates to molding of thermoplastics. In one of its aspects, this invention relates to molding of 1-olefin polymers. In another aspect, this invention relates to molding of polyethylene.

It is well known in the art to mold thermoplastics into many useful shapes and articles. For example, these thermoplastic materials can be injection molded to form cups, bowls, beakers, etc. The injection molding process is carried out by heating the thermoplastic to above its softening temperature and forcing the material into a mold cavity under high pressure. Such useful articles can also be produced by compression molding wherein the polymer is placed into a mold cavity, heated, and then the mandrel or ram is inserted under high pressure causing the polymer to flow up and around the forming mandrel and filling the interface thereby forming the desired article. These methods are well known in the art. Such methods require expensive and bulky equipment and are not particularly suited for forming laminated articles.

We have found that molded articles of thermoplastic materials can be readily formed with relatively light equipment if the mandrel is coated with the polymer to the desired thickness and the article smoothed off by inserting the coated mandrel into the mold cavity. Laminated articles are readily formed by coating the mandrel with a theromplastic and using the coated mandrel as a ram in compression molding of a second polymer. For example, the thermoplastics are frequently more resistant to petroleum solvents than are thermosetting plastics such as phenolic plastics. By the method of this invention, a beaker having an interior surface of a thermoplastic polymer and an exterior of a thermosetting polymer can be readily produced. Another example, a beaker having a polyamide interior and a polyethylene exterior can be produced. The polyamide could be sufficiently thin to be flexible and be supported by a thicker flexible polyethylene. By such procedure, a beaker is readily formed which is flexible and yet has the resistance to certain solvents of the polyamide. Many other applications will be readily apparent to those skilled in the molding art.

It is an object of this invention to provide a novel molding method.

It is another object of this invention to provide a method of molding thermoplastics requiring relatively inexpensive equipment.

Still another object of this invention is to provide a method of preparing molded objects of laminated structure.

Still other objects, features and advantages of this invention will be obvious to those skilled in the art having been given this disclosure.

According to this invention a mandrel which is heated above the softening point of the polymer is coated with a thermoplastic polymer and thereafter the thus coated mandrel is inserted into a mold cavity to complete the molding operation.

When forming a homogeneous article by the process of this invention, the mandrel is heated to above the softening temperature of the polymer and the hot mandrel is dipped into a bed of solid polymer particles. The particles are heated to above the softening temperature by the mandrel and cling to the mandrel. Preferably, the mandrel is withdrawn and dipped successively into a fluidized bed of polymer particles said bed being fluidized by introducing an inert gas into said bed. In any case, the mandrel is coated to the desired thickness and the hot mandrel inserted into the cavity thereby finishing the article being formed. The mold is then cooled, e.g., by running a cooling fluid through the cavity mold, by natural radiation and convection or any other suitable means and the solidified article removed.

When a laminated article is desired, several methods can be advantageously employed. Where the outside polymer has a lower softening point than the inside polymer and is also thermoplastic, then the mandrel can be first coated with the higher softening point material and the temperature lowered to a temperature intermediate the softening point of the two polymers and the process repeated with the second polymer after which the article is finished as in the previously described method.

Where the outside polymer has a higher softening temperature or where it is a thermosetting polymer, the mandrel is first coated as described and the second polymer placed in a mold and heated to above its softening temperature. The mandrel is cooled, in this case to below the softening temperature of the polymer coating same, and is used as a compression ram causing the second polymer to flow up and around the coated mandrel.

In another embodiment, the mandrel can be first coated and a reinforcing fiber, e.g., glass fibers, placed on the soft polymer, the polymer solidified and the mandrel used as a compression ram on a second polymer. By so operating a reinforced article is readily formed. It is, of course, within the scope of this invention to use polymer having fiber dispersed therein in either layer.

It is also preferred that a parting agent be applied to the mandrel before coating to insure ease of removal of the formed article. Many such agents are known to the art, such as silicone oils, talc and the like.

Figure 2:
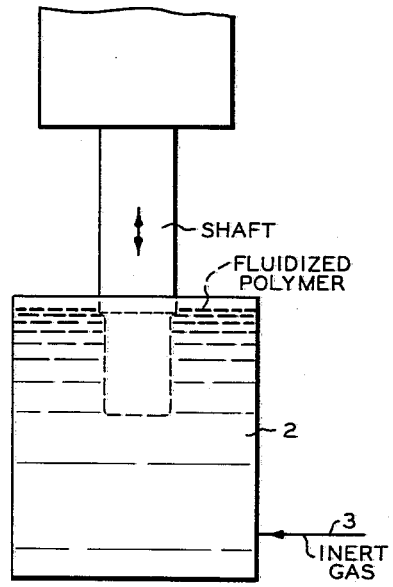
Figure 3:
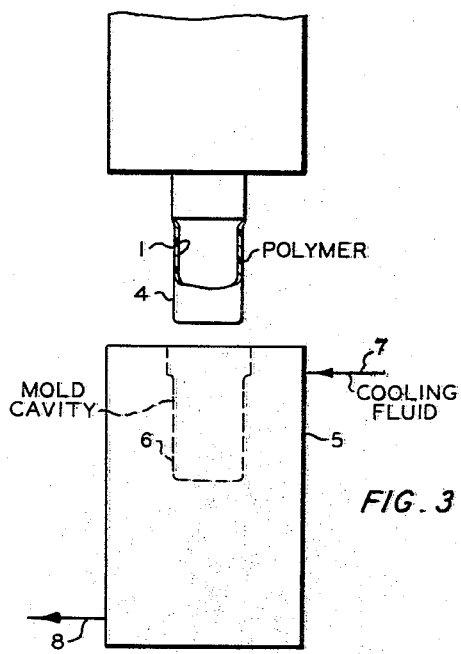

The drawing illustrates a preferred method of the instant invention. FIGURE 1 shows a hot mandrel ready to be dipped or immersed into a vessel containing solid polymer. FIGURE 2 shows the same mandrel dipped into a vessel containing fluidized polymer. FIGURE 3 shows the coated mandrel after removing from the polymer prior to inserting into a mold.

Referring to the drawing, a mandrel 1 is heated by any suitable means and is shown as being ready to immerse in solid polymer 9 which is contained in vessel 2. In FIGURE 2, the hot mandrel 1 is immersed in fluidized polymer contained in vessel 2. An inert fluidizing gas passes to container 2 via conduit 3. In FIGURE 3, the hot mandrel 1 is shown coated with polymer 4. This mandrel is then inserted into the cavity 6 of mold 5. The mold is cooled by means of cooling fluid passing through the mandrel via conduits 7 and 8.

As has been indicated, the method of this invention is applicable broadly to thermoplastic polymers. Examples of such polymers include polyamides such as nylon, polyvinylchloride, polytetrafluoroethylene, polytrifluorochloroethylene, polyacrylates such as polymethylmethacrylate, polyolefins such as polyethylene and polypropylene and similar thermoplastic polymers. The polymer used for coating the mandrel will be a thermoplastic, however, the second polymer for laminaates can be thermosetting such as the phenolic polymers. Copolymers are also applicable so long as they are thermoplastic when used for the mandrel coating.

The method of this invention is particularly useful with polymers of aliphatic 1-olefins, particularly mono-1-olefins of 2 to 8 carbon atoms per molecule and having no branching nearer the double bond than the 4-position. Such polymers can be prepared by any method known to the art, such as the older and well known high pressure polymerization of such 1-olefins as ethylene as is disclosed by Fawcett et al. in U.S. Patent 2,153,553 or the high pressure method of Larcher et al. described in U.S. Patent 2,816,883. Preferably the polymer will be one produced by one of the newer low pressure catalytic methods such as is described in the application of Hogan and Banks filed March 26, 1956, having Serial No. 573,877, now Patent No. 2,825,721.

According to the Hogan and Banks patent, polymers are produced by polymerizing 1-olefins having a maximum chain length of 8 carbon atoms and no branching nearer the double bond than the 4-position by contacting with a solid catalyst containing, as an essentially catalytic ingredient, chromium oxide associated with at least one porous oxide selected from the group consisting of silica, alumina, zirconia and thoria. Liquid phase or vapor phase operation can be employed. A highly satisfactory method involves contacting the monomer in the presence of a hydrocarbon diluent, in liquid phase, with a suspended comminuted catalyst of the type described by Hogan and Banks. It is preferred that the chromium content of the catalyst be in the range 0.5 to 10 weight percent that an appreciable proportion of the chromium be in the hexavalent state, e.g., 0.1 to 5 weight percent of the catalyst be hexavalent chromium. This catalyst is generally activated under non-reducing conditions, preferably by contact with an oxidizing gas such as air, at high temperature, e.g., 700 to 1000° F. prior to use. By one method of operation, the polymerization is carried out in a solvent such as cyclohexane at a temperature above the solution temperature of the polymer being formed, e.g., 250–375° F. In a method described in the copending application of Leatherman and Detter, Serial No. 590,567, filed June 11, 1956, a process is described wherein the polymerization is carried out in a solvent such as pentane at a temperature below the solution temperature thereby forming polymer as discrete particles. In any case, the polymer is separated from diluent by filtration, flashing of solvent, steam distillation or the like. Polymers produced by such a process will ordinarily have a molecular weight in the range 35,000 to 100,000, a density in the range 0.95 to 0.97, e.g., approximately 0.96, and a crystallinity in the range 90 to 95 percent. The polymer ordinarily has a melting point in the range 250–265° F. and a softening point of about 265° F. or higher. The difference between melting point and softening point is due to the difference in method by which these values are obtained as is known by those skilled in the polymer art. Polymers produced by these processes have unsaturation which is preponderantly of the terminal vinyl and/or trans-internal structure. So-called "branched vinyl" unsaturation is substantially absent. These terms are more fully discussed in the cited Hogan and Banks application.

Another suitable, but non-equivalent, method of producing highly crystalline, high density polymer comprises contacting an olefin such as ethylene, propylene, 1-butene and the like with a catalyst such as a mixture of a compound represented by the formula $AlR_3$ wherein R is a saturated aliphatic, cycloaliphatic or aromatic hydrocarbon radical or hydrogen, and a second compound which is ordinarily a halogen compound of a metal such as titanium, zirconium, chromium or molybdenum. An example of such a catalyst is a mixture of triethyl-aluminum and titanium tetrachloride. A similar suitable catalyst comprises a mixture of a compound represented by the formula $R_mAlX_n$ wherein R is a hydrocarbon radical of the type previously described, X is a halogen and $m+n=3$, i.e., the valence of aluminum; and a metal compound such as titanium dioxide, tetralkoxides of titanium and tetravalent titanium salts of organic carboxylic acids. An example of such a catalyst is a mixture of diethylaluminum chloride, ethylaluminum dichloride and titanium tetrachloride. A similar type of catalyst mixture comprises a halide of a group IV metal, e.g., titanium tetrachloride and a free metal, such as metallic sodium or metallic magnesium. The reaction with these catalysts is preferably carried out in the presence of a hydrocarbon diluent in liquid phase at a temperature in the range from room temperature up to 300° C. Polymers produced in the presence of these catalysts have a molecular weight which can range from 10,000 to 200,000 or even higher. They generally have crystallinities of the order 80 to 85 percent and densities of about 0.75.

Still another method of forming such polymers is to liquefy the 1-olefin and carry out the polymerization in liquid phase.

While 1-olefins polymerized by any of the methods known to the art can be employed in the process of this invention, it is preferred to use a polyolefin of high crystallinity, i.e., 80 percent or higher, and density of at least 0.94.

The polyolefins particularly applicable in the process of this invention are those normally solid polyolefins prepared by polymerizing a major amount, preferably at least 90 weight percent, of a 1-olefin of 2 to 8 carbon atoms, having a sole ethylenic unsaturation and having no branching nearer the double bond than the 4-position and even more preferably the polymer is polyethylene or a copolymer of a major proportion of ethylene with one or more 1-olefins. Such polymers will be referred to herein as ethylene polymers. Examples of the preferred 1-olefins include ethylene, propylene, 1-butene, 1-pentene, 1-hexene, 1-octene, 4-methyl-1-pentene, 4-methyl-1-hexene, 5-ethyl-1-hexene, 6-methyl-1-hexene, 4-ethyl-1-hexene, 4,5-dimethylhexene, and the like. These olefins can be polymerized with each other or with other olefins such as 1,3-butadiene, butene-2, and the like.

Specific embodiment

Powdered polyethylene prepared in cyclohexane solution and in the presence of a chromium oxide catalyst as previously described and having a softening point of 265° F., a crystallinity in excess of 95 percent and a density of about 0.96, is placed in a vessel and is fluidized by introducing nitrogen into the bottom of the vessel. A steel mandrel in the form of a beaker pretreated with a commercial silicone oil parting agent is heated to 500° F. and is lowered into the fluidized polymer for about 3 minutes, the mandrel is withdrawn and inserted into a mold at about 200° F. said mold being mated to the mandrel. A small amount of polymer is forced out of the mold. The assembly is allowed to cool to below 230° F., the mandrel withdrawn and the completed beaker ejected.

In a second embodiment, a silicone oil pretreated mandrel is heated to 600° F. and is dipped into a fluidized bed of nylon for one minute. A predetermined weight of polyethylene is heated to 500° F. in a mated mold and the coated mandrel, cooled to 200° F., is inserted into the mold causing the polyethylene to flow up and around the nylon coated mandrel, the assembly is then cooled to below 200° F. and the mandrel withdrawn and the resulting laminated beaker ejected.

In a third embodiment, a mandrel coated with polyethylene as described above has fibers of glass placed on the coated surface prior to cooling, the mandrel cooled and the cool mandrel inserted into a matched mold containing additional hot polyethylene. After the assembly is cooled, the reinforced beaker is recovered as above.

Those skilled in the art will see many applications and modifications which can be employed.

We claim:
1. A method of forming a laminated thermoplastic article comprising heating a mandrel to above the softening temperature of said thermoplastic, inserting the heated mandrel into a bed of powdered thermoplastic polymer thereby causing the polymer to fuse on said mandrel, inserting the thus treated mandrel into the cavity of a matched mold containing a polymeric material with sufficient force to cause said material to flow around said coated mandrel and form said article, and thereafter recovering the thus formed article.

2. The process of claim 1 wherein the thermoplastic polymer is a polymer of a mono-1-olefin.

3. A method of forming a laminated polymeric object which comprises heating a forming mandrel to above the softening temperature of the polymer being formed; coating the mandrel with a parting agent; fluidizing a bed of powdered thermoplastic polymer; dipping the hot mandrel into the fluidized bed to cause polymer to fuse on said mandrel; withdrawing the mandrel from said bed having polymer adhering thereto; inserting the mandrel into the forming cavity of a matched mold containing a polymeric material with sufficient force to cause said material to flow around said coated mandrel and form said laminated object; cooling the assembly to below the softening temperature of the polymers; and ejecting the formed object from said mold and mandrel.

4. The process of claim 3 wherein the mandrel is maintained at above the softening temperature of the thermoplastic polymer during the insertion of same into the mold cavity.

5. A process for forming a laminated polymeric article comprising heating a forming mandrel to above the softening temperature of at least one of the polymers being formed; inserting the hot mandrel into a bed of powdered thermoplastic polymer thereby causing polymer to soften and adhere to said mandrel; withdrawing the said mandrel from said bed; cooling said mandrel to below the softening temperature of said thermoplastic polymer; maintaining a second polymeric material above its softening temperature in the cavity of a forming mold matched to said mandrel; inserting the cooled mandrel into said cavity with sufficient force to cause said second polymer to flow around the coated mandrel; cooling the thus formed assembly to below the softening temperature of said second polymeric material and thereafter recovering the formed article from the assembly.

6. The method of claim 5 wherein the second polymeric material is a second thermoplastic polymer.

7. The method of claim 5 wherein a reinforcing material is applied to the coated mandrel prior to cooling same.

8. The method of claim 5 wherein the thermoplastic polymer is a polymer prepared by polymerizing olefins comprising a major amount of mono-1-olefins of 2 to 8 carbon atoms and no branching nearer the double bond than the 4-position.

9. The method of claim 8 wherein the thermoplastic material is polyethylene.

10. The method of claim 9 wherein the polyethylene has a density of about 0.96 and a crystallinity of at least 90 percent.

11. A method for forming a laminated polymeric article which comprises heating a forming mandrel to above the softening temperature of the thermoplastic polymer being formed, coating the mandrel with a parting agent, inserting the heated mandrel into a bed of powdered thermoplastic polymer thereby causing said thermoplastic polymer to soften and adhere to said mandrel, withdrawing said mandrel coated with said thermoplastic polymer from said bed, cooling said coated mandrel to below the softening temperature of said thermoplastic polymer coating, maintaining a mass of a settable thermosetting polymer in liquid state in the cavity of a forming mold matched to said mandrel, inserting said cooled mandrel into said cavity with sufficient force to cause said thermosetting polymer to flow around said thermoplastic polymer coating on said mandrel and coat said polymer coating with a layer of said thermosetting resin, and thereafter recovering said laminated polymeric article as a product of the method.

12. A method according to claim 11 wherein said bed of thermoplastic polymer is fluidized by introducing an inert gas into said bed.

13. A method according to claim 11 wherein said thermoplastic polymer is polyethylene.

References Cited in the file of this patent

UNITED STATES PATENTS

| | | |
|---|---|---|
| 2,090,528 | Ferngren | Aug. 17, 1937 |
| 2,410,936 | Gronemeyer et al. | Nov. 12, 1946 |
| 2,636,215 | Smith | Apr. 28, 1953 |
| 2,786,007 | Chew | Mar. 19, 1957 |
| 2,844,489 | Gemmer | July 22, 1958 |